(12) United States Patent
Kuster

(10) Patent No.: US 8,705,243 B2
(45) Date of Patent: Apr. 22, 2014

(54) EXTERNAL STORAGE DEVICE

(76) Inventor: Martin Kuster, Walchwil (CH)

( * ) Notice: Subject to any disclaimer, the term of this patent is extended or adjusted under 35 U.S.C. 154(b) by 0 days.

(21) Appl. No.: 13/362,431

(22) Filed: Jan. 31, 2012

(65) Prior Publication Data

US 2012/0200996 A1 Aug. 9, 2012

Related U.S. Application Data

(60) Provisional application No. 61/438,139, filed on Jan. 31, 2011, provisional application No. 61/442,379, filed on Feb. 14, 2011.

(51) Int. Cl.
*H05K 5/00* (2006.01)
*H01R 13/24* (2006.01)

(52) U.S. Cl.
CPC .................................. *H01R 13/2442* (2013.01)
USPC ............................................ 361/752; 361/737

(58) Field of Classification Search
USPC .................. 361/752, 737, 735; 439/131, 527; 174/50.51–50.53
See application file for complete search history.

(56) References Cited

U.S. PATENT DOCUMENTS

| | | | |
|---|---|---|---|
| 7,359,208 B2 * | 4/2008 | Ni .................................. | 361/752 |
| 7,771,215 B1 * | 8/2010 | Ni et al. ........................ | 439/131 |
| 7,921,233 B2 | 4/2011 | Chung | |
| 7,938,659 B1 | 5/2011 | Zhu et al. | |
| 8,061,608 B2 * | 11/2011 | Liao et al. ..................... | 235/439 |
| 8,079,879 B2 | 12/2011 | Chiang | |
| 8,215,996 B2 * | 7/2012 | Su et al. ........................ | 439/660 |
| 8,480,435 B2 | 7/2013 | Hsiao et al. | |
| 2009/0255991 A1 * | 10/2009 | Liao et al. ..................... | 235/441 |
| 2010/0020515 A1 | 1/2010 | Rubino et al. | |
| 2010/0082893 A1 | 4/2010 | Ma et al. | |
| 2010/0202106 A1 | 8/2010 | Kuster | |

OTHER PUBLICATIONS

Restriction Requirement from related U.S. Appl. No. 13/757,505 dated Apr. 23, 2013, 7 pages.
Response to Restriction Requirement from related U.S. Appl. No. 13/757,505 dated May 23, 2013, 4 pages.
Non Final Office Action from related U.S. Appl. No. 13/757,505 dated Jul. 16, 2013, 12 pages.
Office Action from related Mexican Application No. MX/a/2012/001304 dated Jul. 19, 2013, 5 pages.
Notice of Allowance in Related U.S. Appl. No. 13/757,505, dated Nov. 14, 2013, 13 pages.

* cited by examiner

*Primary Examiner* — Yuriy Semenenko
(74) *Attorney, Agent, or Firm* — Kilpatrick Townsend & Stockton LLP

(57) ABSTRACT

Described are external storage devices including a substrate, a controller electrically coupled to the substrate, at least one memory die stack electrically coupled to the substrate, a plurality of connection fingers electrically coupled to the substrate, and a mounting bar electrically coupled to the substrate. The mounting bar may include a plurality of springs. In other examples, the external storage device may include a substrate, a controller electrically coupled to the substrate, at least one memory die stack electrically coupled to the substrate, a plurality of connection fingers electrically coupled to the substrate, and a contact bar electrically coupled to the substrate. The contact bar may include a plurality of extensions. One or more memory die stacks may be coupled to one or more surfaces of the substrate and may include a plurality of dies in each memory die stack.

18 Claims, 34 Drawing Sheets

EXTERNAL STORAGE DEVICE

CROSS REFERENCE TO RELATED APPLICATION

This application is related to and claims priority benefits from U.S. Provisional Application Ser. No. 61/438,139, filed on Jan. 31, 2011, entitled USB 3 COB STICK, and from U.S. Provisional Application Ser. No. 61/442,379, filed on Feb. 14, 2011, entitled USB 3 COB STICK BACK CONTACT. The '139 and '379 applications are hereby incorporated herein in their entirety by this reference.

FIELD OF THE INVENTION

The invention relates to mobile storage devices and the like.

BACKGROUND

Universal serial bus ("USB") sticks consist of a memory data storage device integrated with a USB interface. USB sticks are typically used for similar purposes for which floppy disks or CD-ROMs were previously used. However, USB sticks are smaller, faster, have thousands of times more capacity, and are more durable and reliable. In the case of USB sticks with chip on board ("COB") flash memory, a USB controller and flash memory can be combined into one structure that is embedded into one side of a printed circuit board ("PCB") with the USB connection located on an opposing surface.

The USB standard that governs the design of the USB connections has undergone several revisions since its earliest release in 1994. The first widely adopted version, USB 1.1, specified data rates of 1.5 Mbit/s ("Low-Bandwidth") and 12 Mbit/s ("Full-Bandwidth"). USB 1.1 was replaced by USB 2.0 in 2000. USB 2.0 provided a higher maximum data rate of 480 Mbit/s ("Hi-Speed"). In this version, the USB 2.0 cable has four wires: two wires for power (+5 volts and ground) and a twisted pair of wires for carrying data. In the USB 2.0 design, as well as USB 1.1, data is transmitted in one direction at a time (downstream or upstream).

In 2008, a new USB 3.0 standard was announced. USB 3.0 includes a new "SuperSpeed" bus, which provides a fourth data transfer mode at 5.0 Gbit/s. In order to achieve this increased throughput, the USB 3.0 cable has a total of eight wires: two wires for power (+5 volts and ground), the twisted pair for carrying non-SuperSpeed data (allows backward compatibility with earlier versions of USB devices), and two differential pairs for carrying SuperSpeed data. Full-duplex signaling occurs over the two differential pairs.

To date, adoption of the USB 3.0 standard has been slow due to the need to re-design motherboard hardware that supports the USB 3.0 standard, and the need to revise operating systems to support the USB 3.0 standard. To ease the transition to the USB 3.0 standard, it is desirable to modify existing USB 2.0 COB sticks to also include USB 3.0 connections.

Because the USB 2.0 COB stick configuration has a rectilinear design with the components embedded on one side of the PCB and the USB 2.0 connections positioned flush with the opposing side of the PCB, the shape and configuration does not readily allow the addition of a USB 3.0 connection to the existing USB 2.0 COB stick. With USB 3.0 being the coming standard and much faster than USB 2.0, it is desirable to provide a design that incorporates USB 3.0 connections into existing USB 2.0 COB sticks so that the USB COB stick may connect to either version of the USB standard.

SUMMARY

Embodiments of the invention may comprise an external storage device having a substrate, a controller electrically coupled to the substrate, at least one memory die stack electrically coupled to the substrate, a plurality of connection fingers electrically coupled to the substrate, and a mounting bar electrically coupled to the substrate. The external storage device may be configured to support at least two USB standards with interfaces that are mechanically different. The mounting bar may be mounted to a component surface of the substrate and may be substantially enclosed by an outer casing that surrounds the substrate. In these embodiments, the external storage device may comprise substantially flat surfaces on all sides. The mounting bar may also comprises a plurality of springs. In some embodiments, the plurality of springs may include a coupling projection positioned proximate an end of each spring. The coupling projections may be configured to extend through a plurality of apertures in the component surface in an uncompressed position.

In other embodiments, the external storage device may comprise the substrate, the controller electrically coupled to the substrate, the memory die stack electrically coupled to the substrate, the plurality of connection fingers electrically coupled to the substrate, and a contact bar electrically coupled to the substrate. The external storage device may be configured to support at least two USB standards with interfaces that are mechanically different. The contact bar may be mounted to a connection surface of the substrate and may also include a cover. In these embodiments, the contact bar comprises a plurality of extensions. In some embodiments, the plurality of extensions may include a coupling projection positioned proximate an end of each extension. The coupling projections may be configured to extend through a plurality of apertures in the cover in an uncompressed position.

The memory die stack may be mounted to the component surface or a connection surface of the substrate. In some embodiments, the external storage device further comprises a plurality of memory die stacks. In these embodiments, at least one of the memory die stacks is attached to a connection surface of the substrate, and at least one of the memory die stacks is attached to a component surface of the substrate. The memory die stacks may each comprise a plurality of dies. In some embodiments, at least two of the memory die stacks are stacked in an overlapping arrangement.

DETAILED DESCRIPTION

Figure 1:
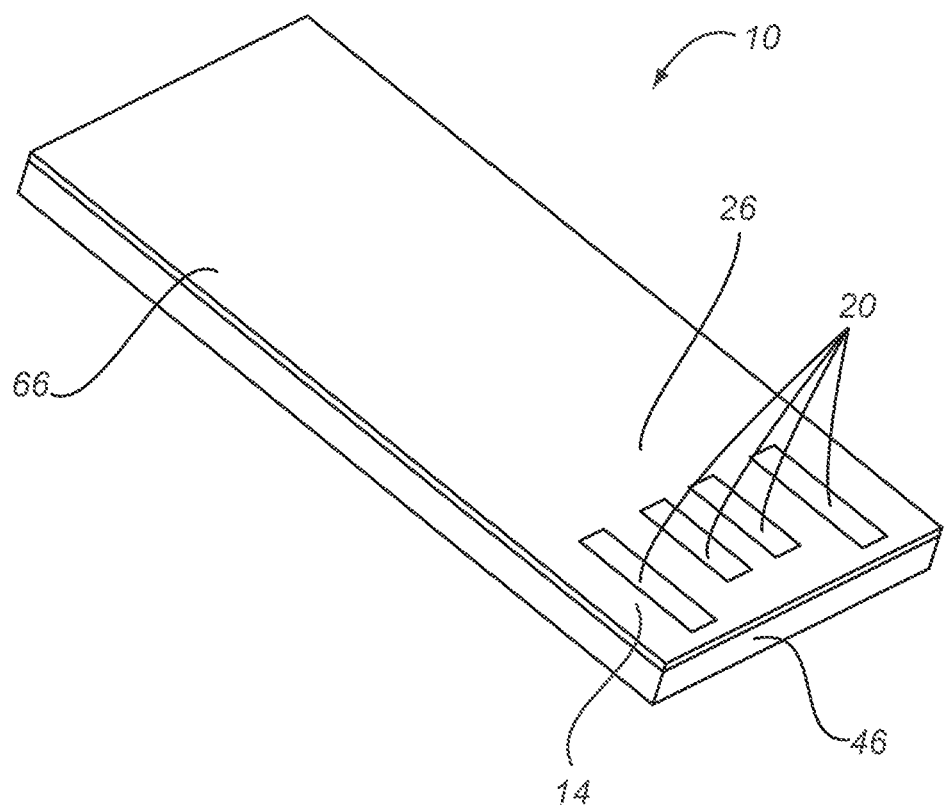
FIG. 1 is a front perspective view of an external storage device according to certain embodiments of the present invention.

The described embodiments of the invention provide external storage devices for use with multiple interface connection standards. While the designs are discussed for use with external storage devices, they are by no means so limited. Rather, embodiments of these designs may be used for other devices that couple to any type of serial bus connection, parallel bus connection, or otherwise as desired.

FIGS. 1-34 illustrate embodiments of an external storage device 10. In the embodiments shown in FIGS. 8-13, the device 10 comprises a substrate 12, a connector 14, a controller 16, and at least one memory die stack 18.

Figure 11:
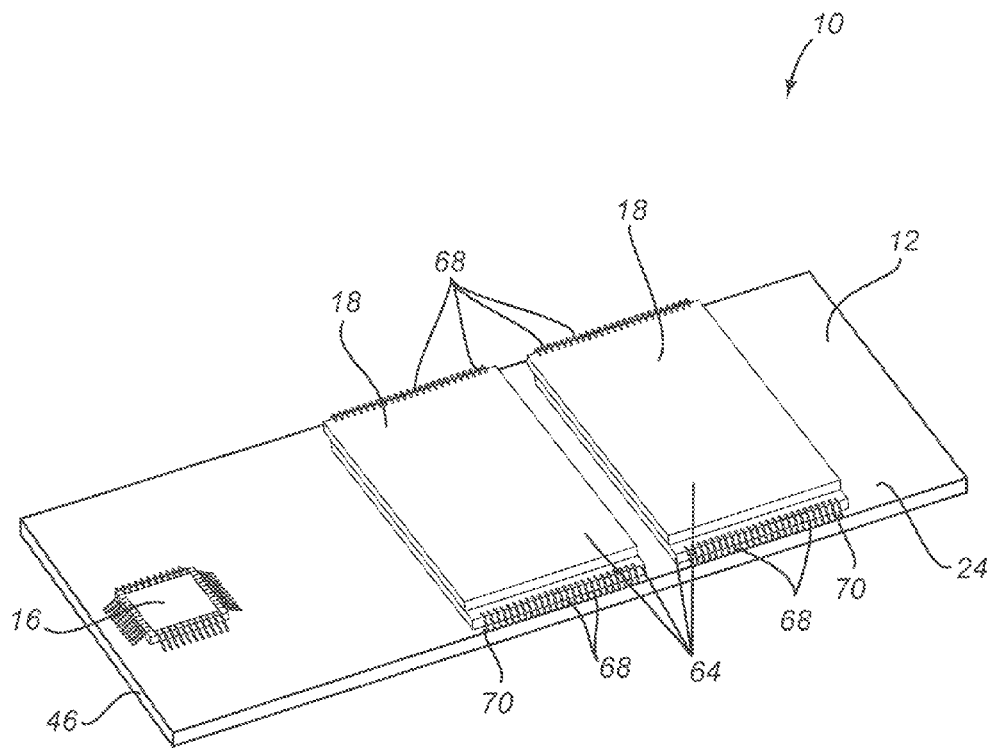
FIG. 11 is a back perspective view of the external storage device of FIG. 2.
Figure 13:
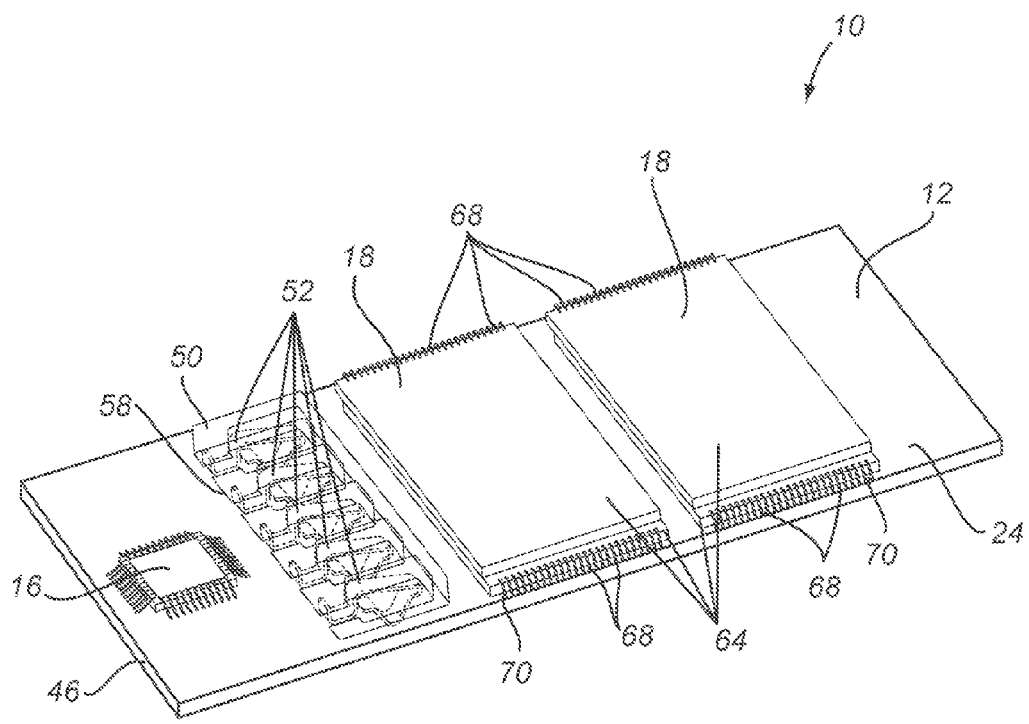
FIG. 13 is a back perspective view of the external storage device of FIG. 12.

As best shown in FIGS. 11 and 13, the substrate 12 may be a printed circuit board ("PCB"), which is used to mechanically support and electrically connect the other components of the device 10. In some embodiments, the substrate 12 can include a component surface 24 and a connection surface 26. Items such as an oscillator, an LED status light, discrete components, or other suitable devices, may be mounted and electrically coupled to the component surface 24 and/or the connection surface 26.

In some embodiments, as illustrated in FIGS. 1-2, 7-10, and 12, the connector 14 may be positioned proximate an end 46 of the substrate 12 and configured to be inserted within a corresponding connector. In certain embodiments, the connector 14 may be configured to couple to a corresponding USB 2.0 connector, USB 3.0 connector, or any other standard that is forward or backwards compatible with any of the foregoing USB standards, other suitable serial bus connection, parallel bus connection, or otherwise as desired. However, one of ordinary skill in the relevant art will understand that the connection standards may be any suitable connection standards that achieve the desired performance of the device 10.

Figure 7:
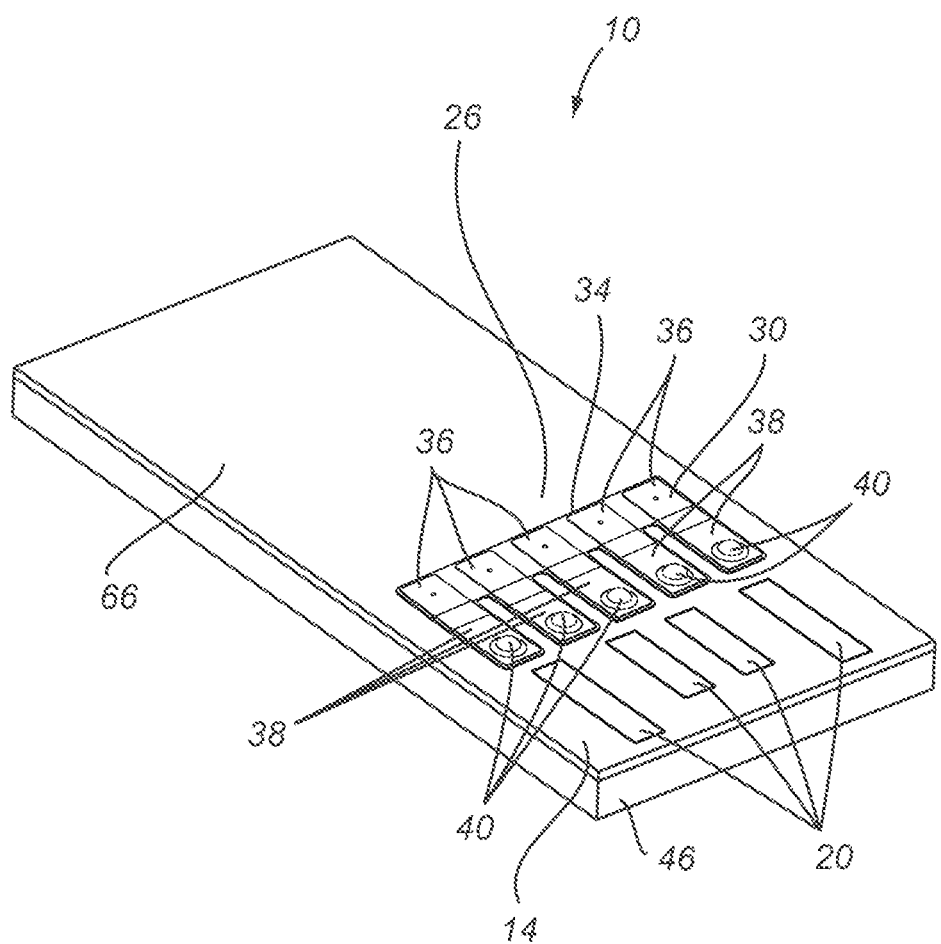
FIG. 7 is a front perspective view of the board of FIG. 4 in use with the external storage device of FIG. 2.
Figure 8:
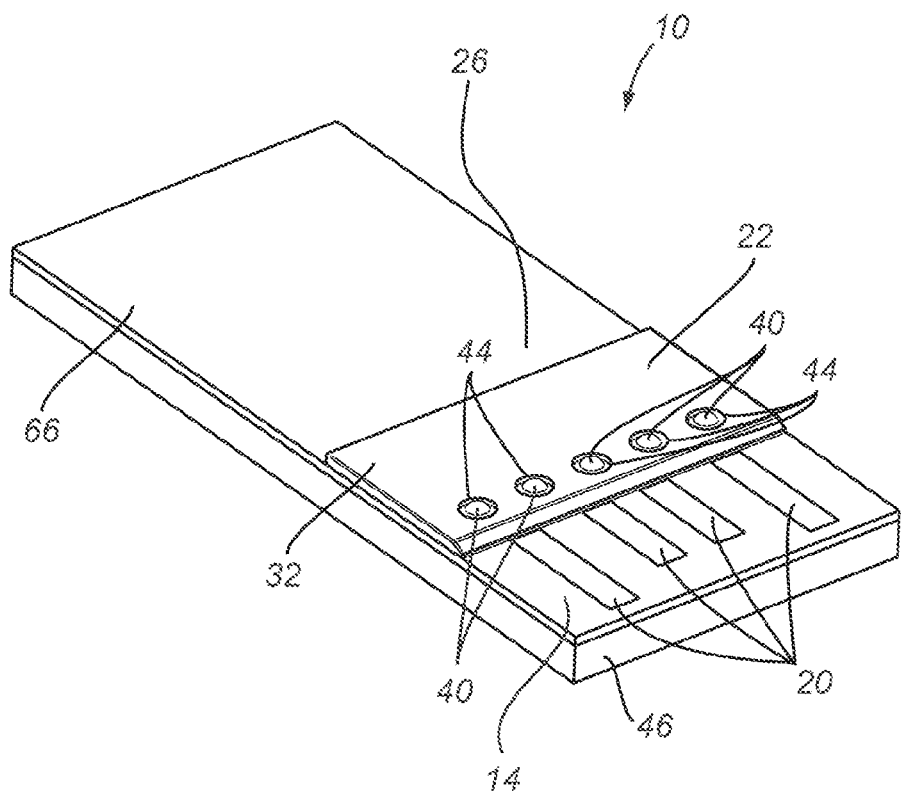
FIG. 8 is a front perspective view of the contact bar of FIG. 3 in use with the external storage device of FIG. 2.
Figure 9:
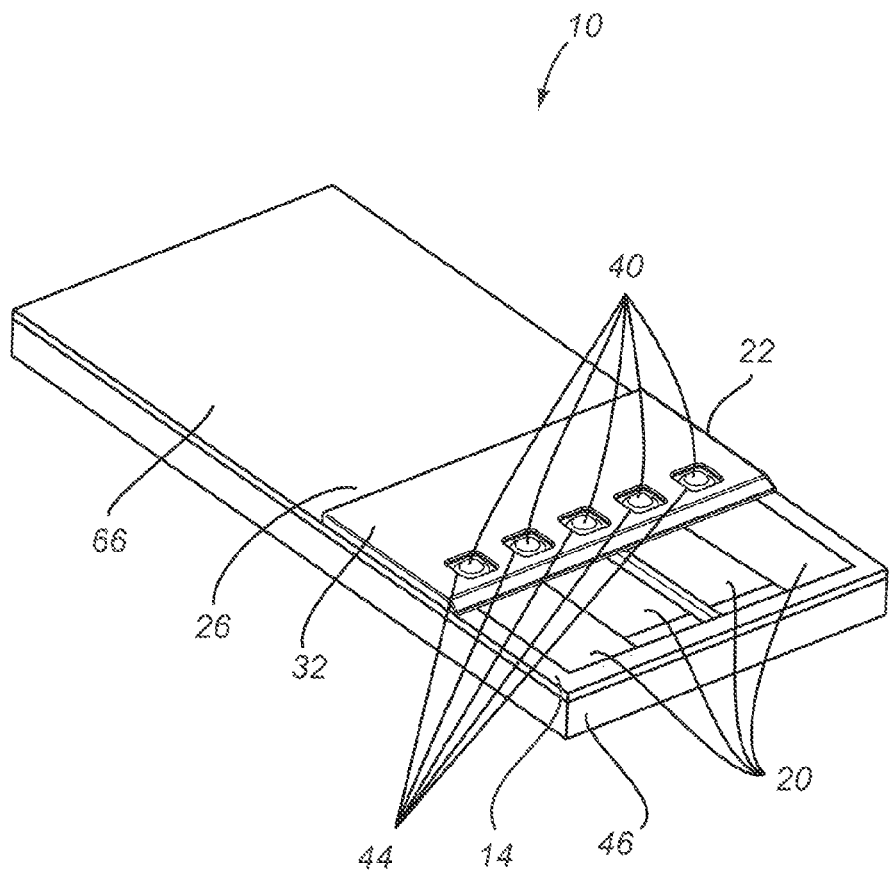
FIG. 9 is a front perspective view of the board of FIG. 4 in use with an external storage device according to other embodiments of the present invention.
Figure 10:
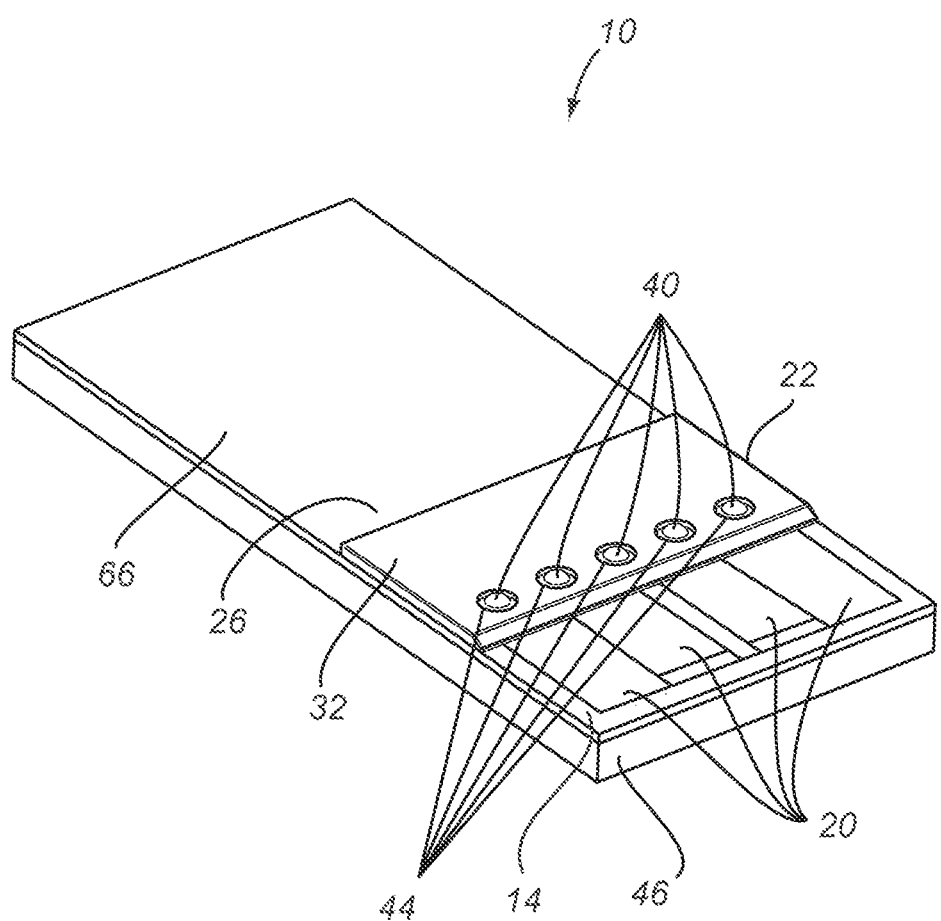
FIG. 10 is a front perspective view of the board of FIG. 4 in use with an external storage device according to other embodiments of the present invention.

In some embodiments, such as the embodiments illustrated in FIGS. 8-10, the connector 14 may comprise a plurality of connection fingers 20 and a contact bar 22. In these embodiments, the connection fingers 20 may be mounted to or embedded within the connection surface 26 of the substrate 12 and electrically coupled to the substrate 12. In certain embodiments, such as where the corresponding connector is a USB 2.0 connector or any other standard that is forward or backwards compatible with the USB 2.0 standard, the connection fingers 20 may be configured to electrically couple to the power and ground wires and the twisted pair of wires (for Hi-Speed and lower data transfer) of the corresponding USB 2.0 connector when the connector 14 is inserted within the corresponding USB 2.0 connector. In the embodiments shown in FIGS. 1-2, 7-10, and 12, the connector 14 may comprise four connection fingers 20. However, one of ordinary skill in the relevant art will understand that any suitable number and configuration of connection fingers 20 may be used in conjunction with the USB 2.0 standard or other suitable standards.

Figure 2:
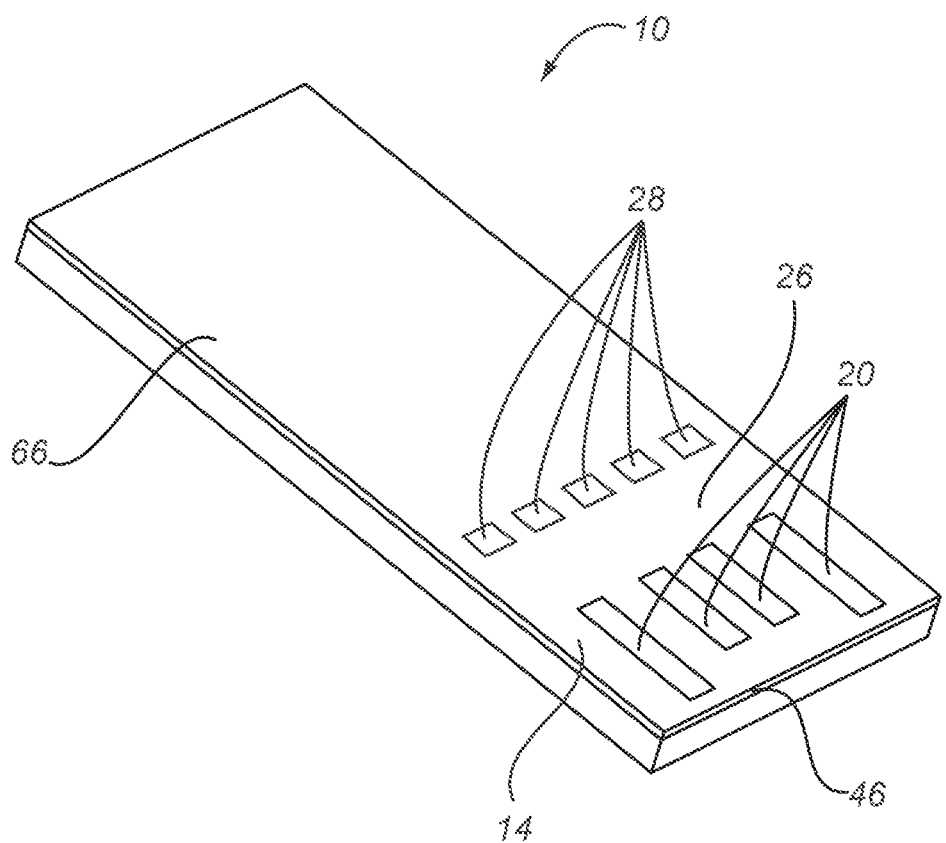
FIG. 2 is a front perspective view of the external storage device of FIG. 1 with coupling points.

In some embodiments, such as the embodiments shown in FIGS. 8-10, the contact bar 22 may be mounted to the connection surface 26 and electrically coupled to the substrate 12 via a plurality of coupling points 28. In these embodiments, as shown in FIG. 2, the substrate 12 comprises five coupling points 28. However, one of ordinary skill in the relevant art will understand that any suitable number and configuration of coupling points 28 may be used. In other embodiments, the coupling points 28 are configured to electrically couple to other types of additional components. In these embodiments, the contact bar 22 forms a projection on the otherwise substantially flat connection surface 26.

Figure 3:
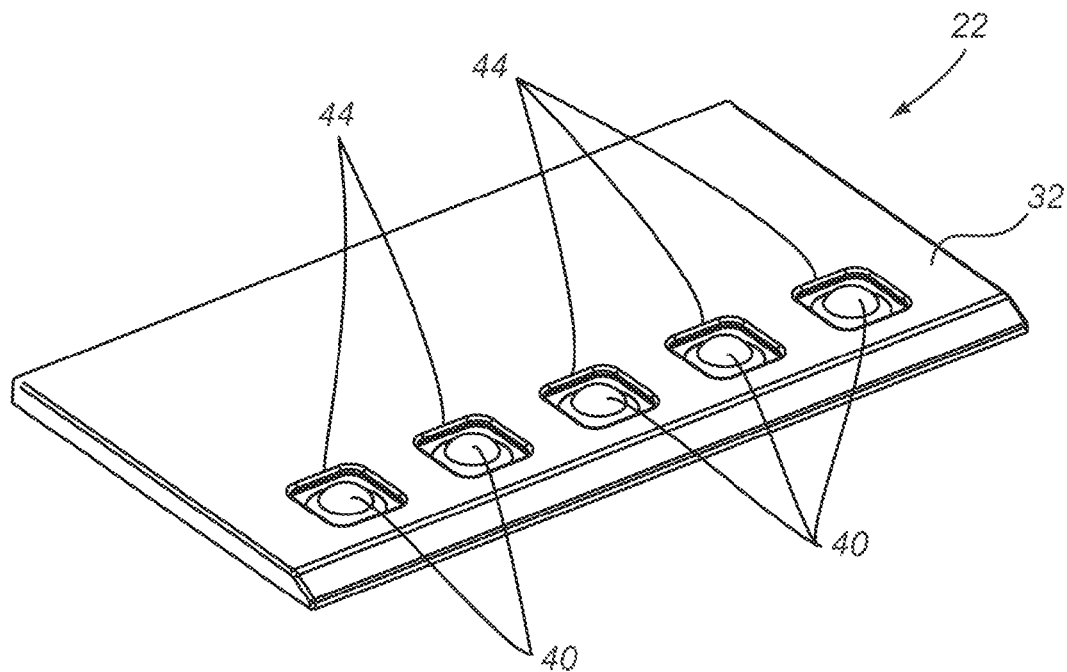
FIG. 3 is a perspective view of a contact bar for use with the external storage device of FIG. 2.
Figure 4:
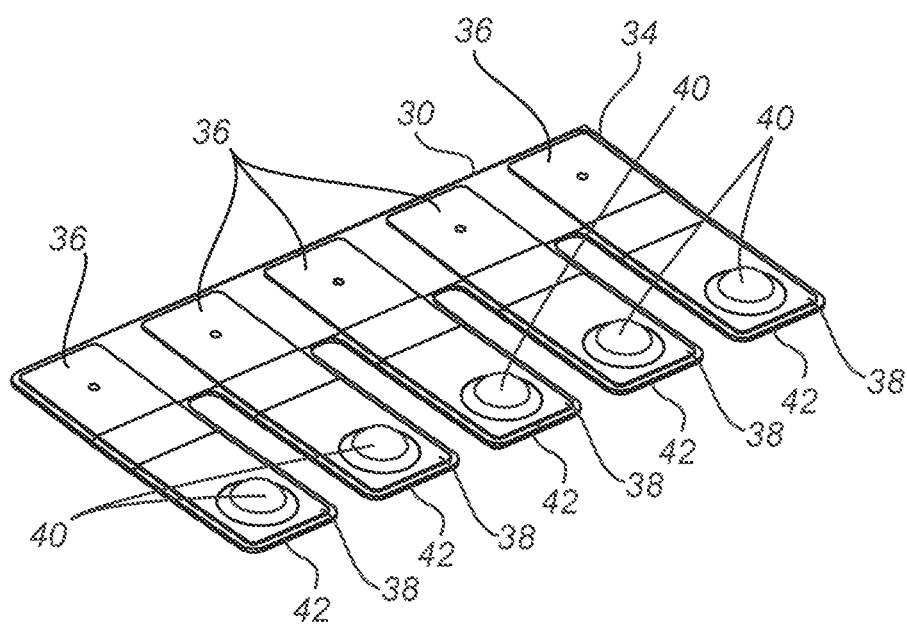
FIG. 4 is a board of the contact bar of FIG. 3.
Figure 5:
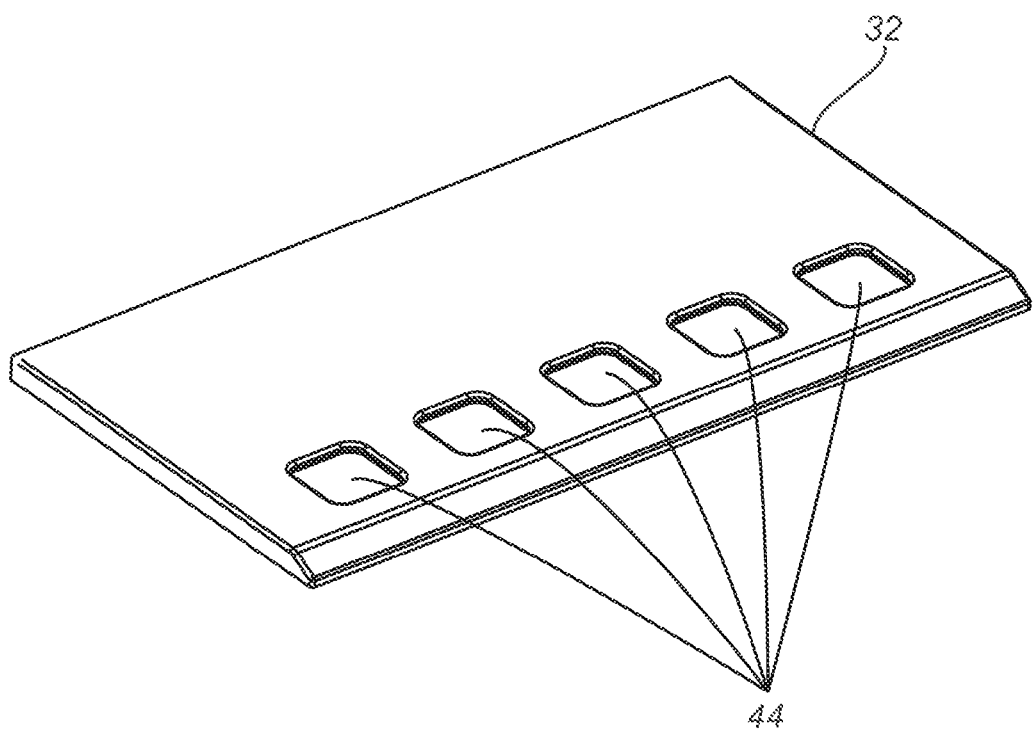
FIG. 5 is a cover of the contact bar of FIG. 3.
Figure 6:
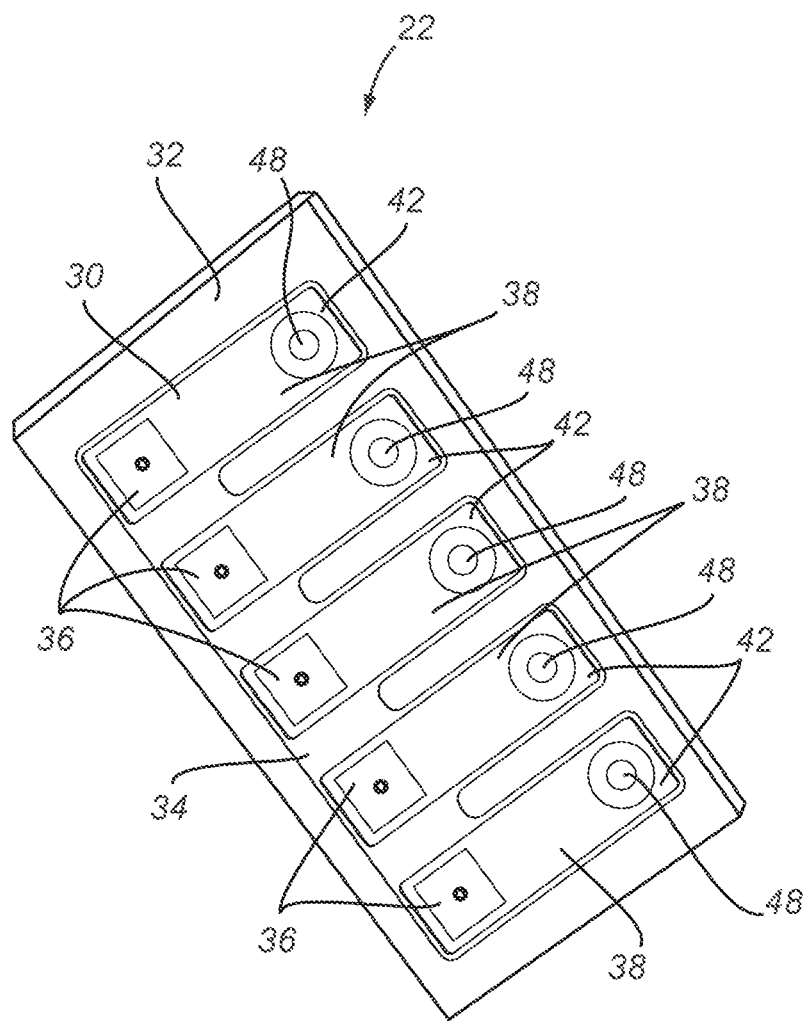
FIG. 6 is a bottom view of the contact bar of FIG. 3.

In some embodiments, as best illustrated in FIGS. 3-6, the contact bar 22 comprises a board 30 and a cover 32. In these embodiments, as shown in FIG. 4, the board 30 may be a PCB, where an end 34 of the board 30 can include a plurality of connection pads 36. In some embodiments, the board 30 may comprise five connection pads 36, as shown in FIGS. 4 and 6-7. However, one of ordinary skill in the relevant art will understand that any suitable number and configuration of connection pads 36 may be used in conjunction with the USB 3.0 standard or other suitable standards.

The connection pads 36 may be positioned on the board 30 so as to substantially align with the position of the coupling points 28 when the contact bar 22 is mounted to the connection surface 26, as illustrated in FIG. 7. The connection pads 36 may be soldered or otherwise electrically coupled to the coupling points 28 in a suitable manner that allows each connection pad 36 to be electrically connected to the corresponding coupling point 28.

In some embodiments, as shown in FIG. 2, the coupling points 28 may be mounted to or embedded within the connection surface 26 of the substrate 12 and electrically coupled to the substrate 12. In these embodiments, the coupling points 28 may be positioned adjacent and/or behind the connection fingers 20. In other embodiments, the coupling points 28 may be mounted to or embedded within the component surface 24, while the connection fingers 20 may be mounted to or embedded within the connection surface 26, or vice versa. One of ordinary skill in the relevant art will understand that the coupling points 28 may be positioned in any suitable location on the substrate 12 that allows the contact bar 22 to electrically couple to the substrate 12.

The board 30 can include a plurality of extensions 38, as best shown in FIGS. 4 and 6-7. In some embodiments, each extension 38 may also be a PCB having some resilient attributes that cause the extension 38, when bent, to exert a force to return to its original position. One of ordinary skill in the relevant art will understand that the extensions 38 may be made of any suitable material and have any suitable design that allows the contact bar 22 to electrically couple to the corresponding connector when the connector 14 is inserted within the corresponding connector.

In these embodiments, as shown in FIG. 4, each extension 38 can include a coupling projection 40 positioned proximate an end 42 of each extension 38. The coupling projection 40 may be soldered or otherwise electrically coupled to the extension 38 in a suitable manner that allows the coupling projection 40 to be electrically coupled to the corresponding connection pad 36. The coupling projection 40 may have any suitable shape that provides sufficient contact with the corresponding connector when the connector 14 is inserted within the corresponding connector. Examples of suitable shapes include but are not limited to a triangular, L-shape, U-shape, T-shape, solid projection having a circular or rectilinear cross-sectional shape, or other suitable shapes.

In some embodiments, such as the embodiments illustrated in FIG. 3, the cover 32 may be positioned over the board 30. The cover 32 may be formed of materials including but not limited to any high thermal-resistant plastics, polymers, or other suitable materials. As shown in FIGS. 3 and 5, the cover 32 may also include a plurality of apertures 44 positioned over the plurality of extensions 38 and proximate the end 42 of each extension 38. The apertures 44 are configured to allow the coupling projections 40 to extend through the apertures 44 when the extensions 38 are in an uncompressed position.

In some embodiments, the connector 14 may be positioned proximate the end 46 of the substrate 12 so that the connection fingers 20 (when inserted within the corresponding USB 2.0 connector or any other standard that is forward or backwards compatible with the USB 2.0 standard) or the connection fingers 20 and coupling projections 40 (when inserted within the corresponding USB 3.0 connector or any other standard that is forward or backwards compatible with the USB 3.0 standard) electrically couple to the corresponding USB connector. When the connector 14 is inserted within the corresponding USB 3.0 connector (not shown), the USB 3.0 connector presses against the coupling projections 40, in turn applying a bending force to the extensions 38. When the extensions 38 are bent by the USB 3.0 connector, the spring-loaded design of each extension 38 then applies a force to the USB 3.0 connector and the coupling projection 40 to ensure that the components are securely and electrically coupled. In some embodiments, as shown in FIG. 6, a ball 48 may be positioned on the end 42 of each extension 38 opposite the coupling projection 40. The ball 48 may be formed of materials including but not limited to silicone, normal rubber, latex, or other suitable materials. Moreover, the ball 48 may be a metal spring or a micro spring. One of ordinary skill in the relevant art will understand that the ball 48 may have any suitable construction or form that provides elastic properties to the extension 38. The ball 48 provides additional force to create a firm electrical coupling between the corresponding USB 3.0 connector and each coupling projection 40 when the connector 14 is inserted within the corresponding USB 3.0 connector because the ball 48 is at least partially compressed when the connector 14 is inserted within the corresponding USB 3.0 connector.

Figure 12:
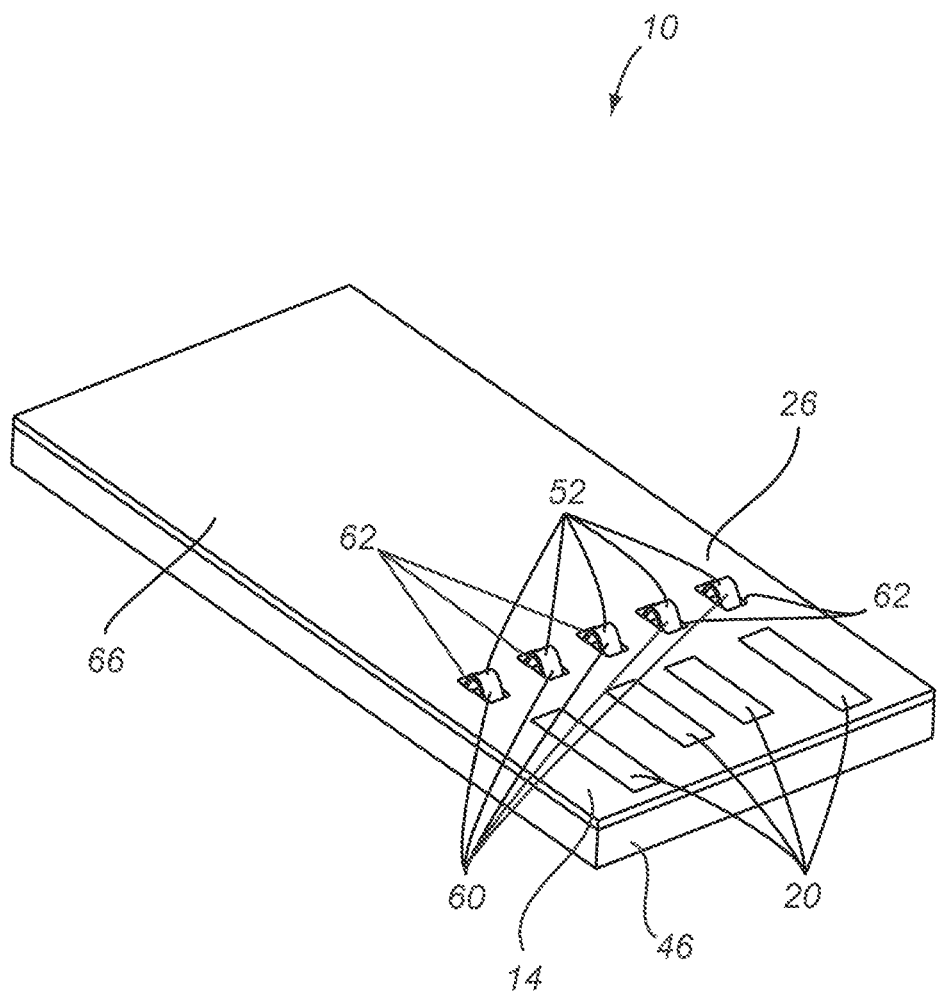
FIG. 12 is a front perspective view of an external storage device according to other embodiments of the present invention.
Figure 14:
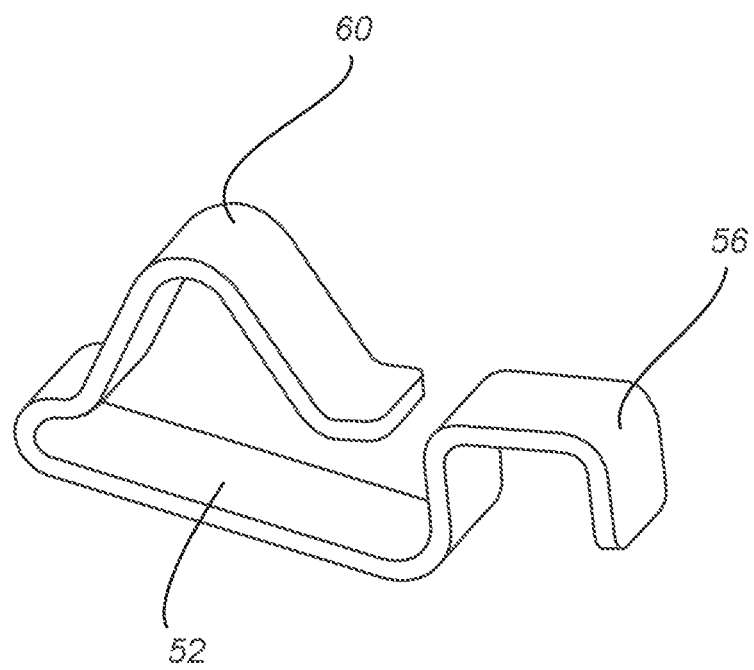
FIG. 14 is a perspective view of a spring of the mounting bar of the external storage device of FIG. 12.
Figure 15:
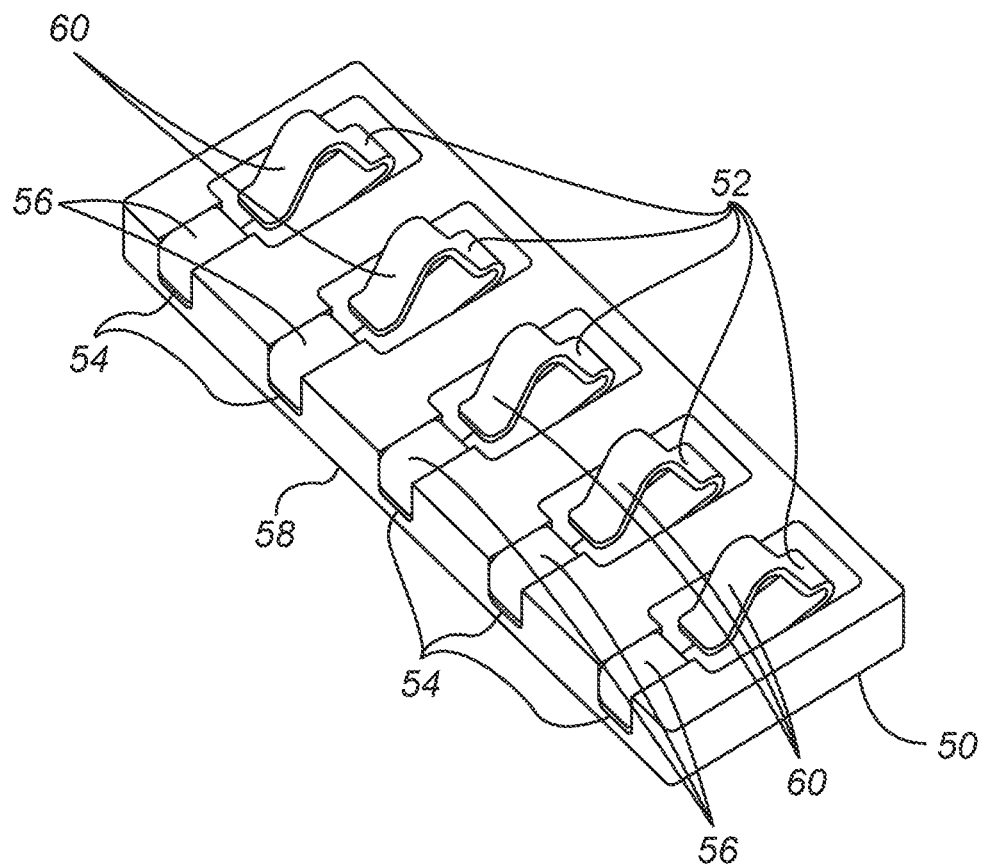
FIG. 15 is a perspective view of the mounting bar of the external storage device of FIG. 12.
Figure 16:
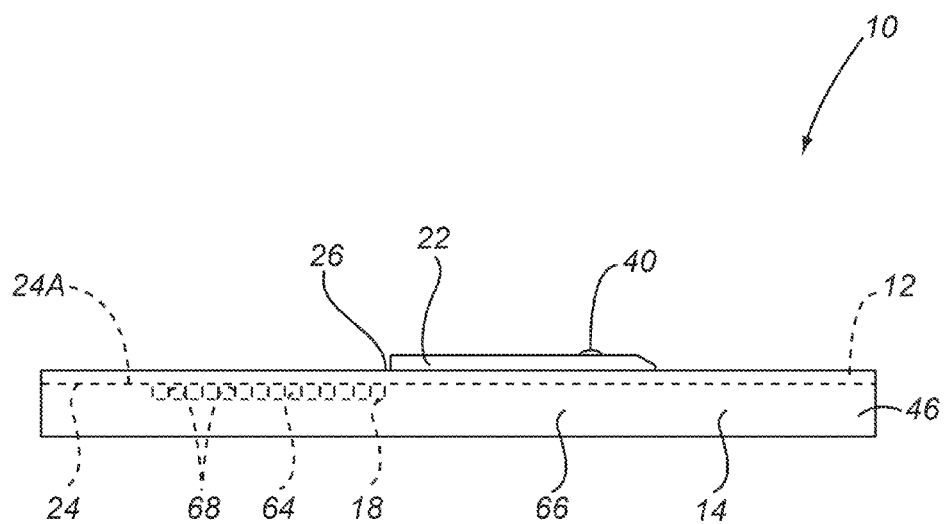
FIG. 16 is a side view of the external storage device of FIG. 2 with a single memory die stack positioned on a component surface of a substrate, the memory die stack having a single die.
Figure 17:
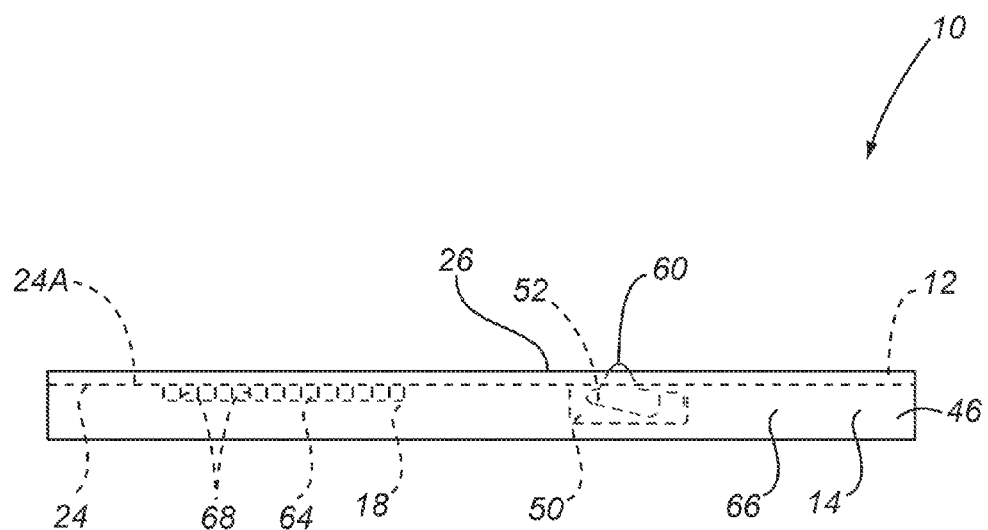
FIG. 17 is a side view of the external storage device of FIG. 12 with a single memory die stack positioned on a component surface of a substrate, the memory die stack having a single die.
Figure 18:
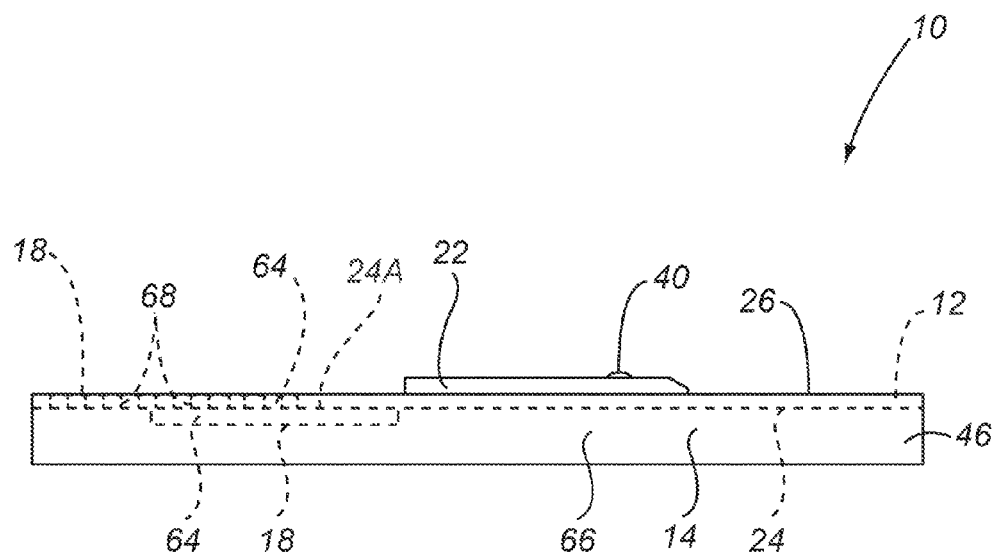
FIG. 18 is a side view of the external storage device of FIG. 2 with two memory die stacks positioned on two surfaces of a substrate, each memory die stack having a single die.
Figure 19:
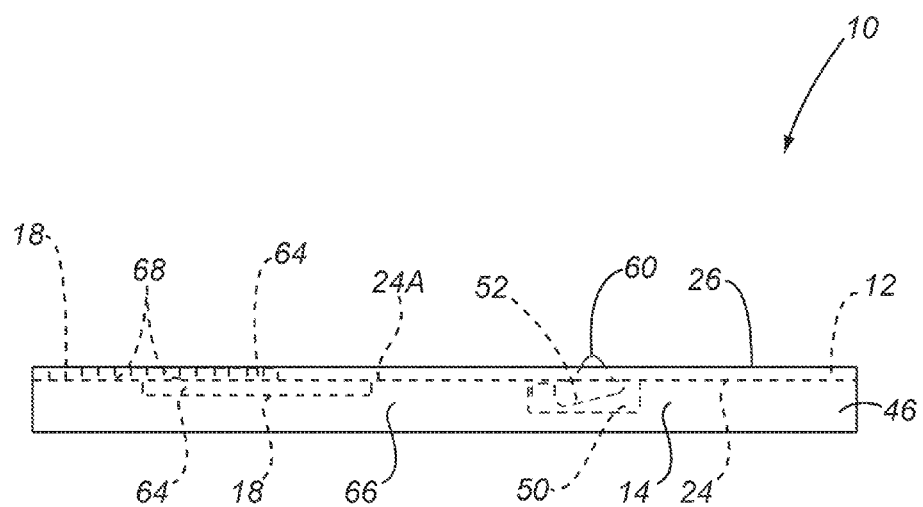
FIG. 19 is a side view of the external storage device of FIG. 12 with two memory die stacks positioned on two surfaces of a substrate, each memory die stack having a single die.
Figure 20:
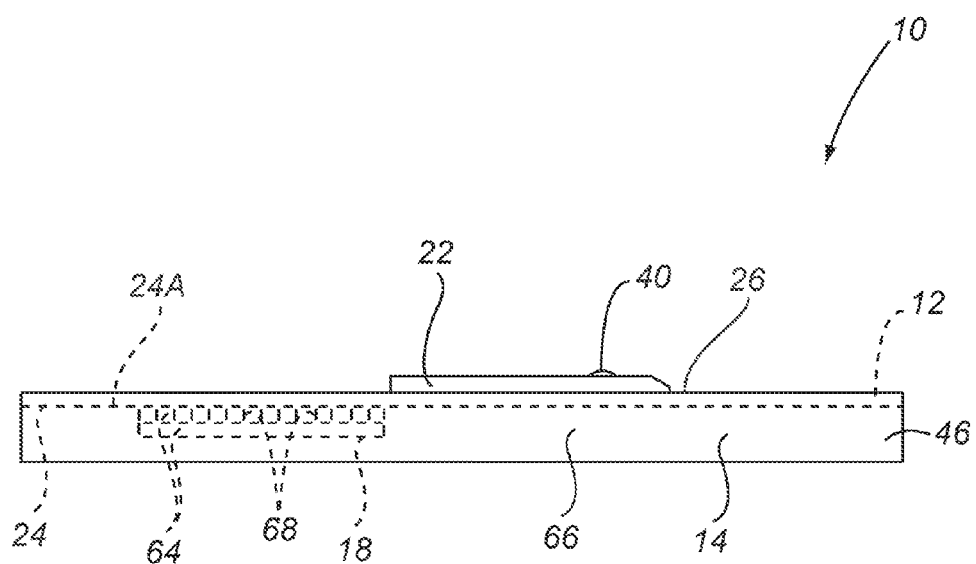
FIG. 20 is a side view of the external storage device of FIG. 2 with a single memory die stack positioned on a component surface of a substrate, the memory die stack having two dies.
Figure 21:
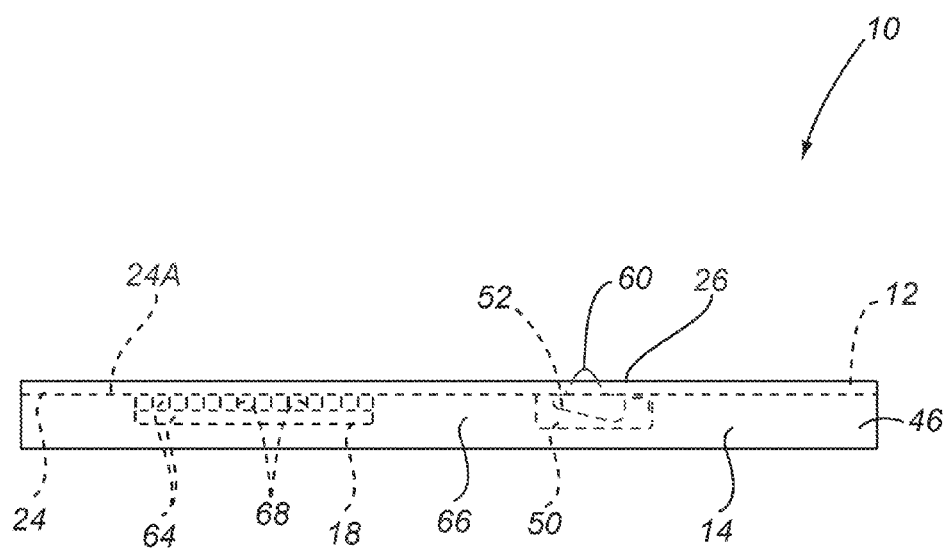
FIG. 21 is a side view of the external storage device of FIG. 12 with a single memory die stack positioned on a component surface of a substrate, the memory die stack having two dies.
Figure 22:
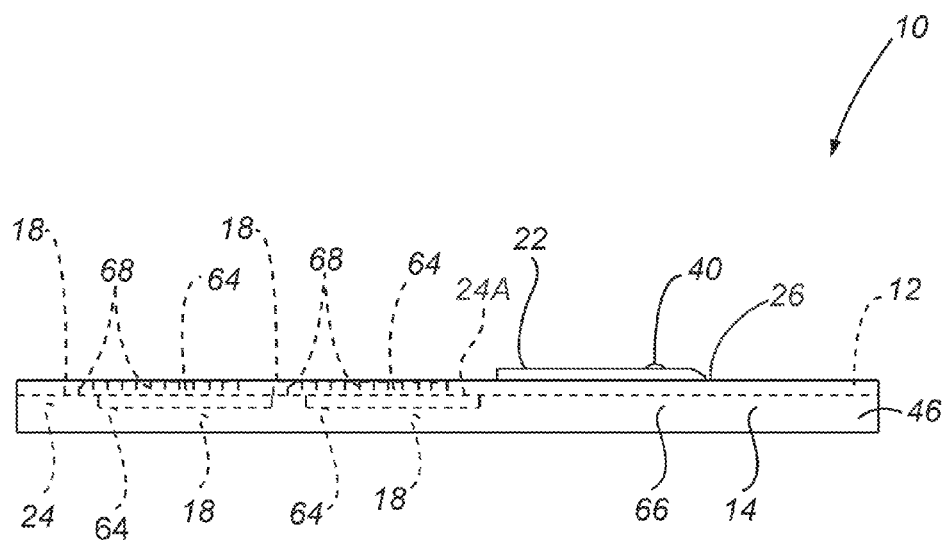
FIG. 22 is a side view of the external storage device of FIG. 2 with four memory die stacks positioned on two surfaces of a substrate, each memory die stack having a single die.
Figure 23:
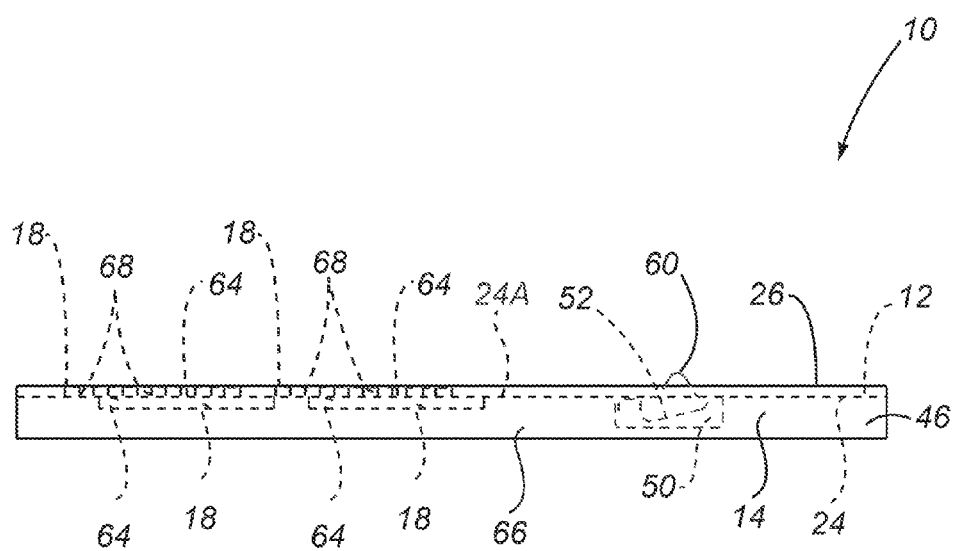
FIG. 23 is a side view of the external storage device of FIG. 12 with four memory die stacks positioned on two surfaces of a substrate, each memory die stack having a single die.
Figure 24:
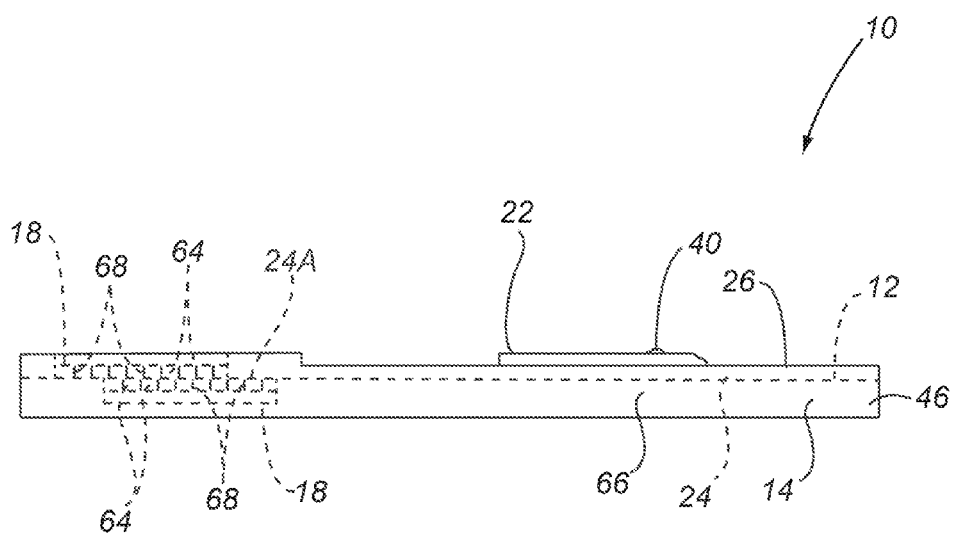
FIG. 24 is a side view of the external storage device of FIG. 2 with two memory die stacks positioned on two surfaces of a substrate, each memory die stack having two dies.
Figure 25:
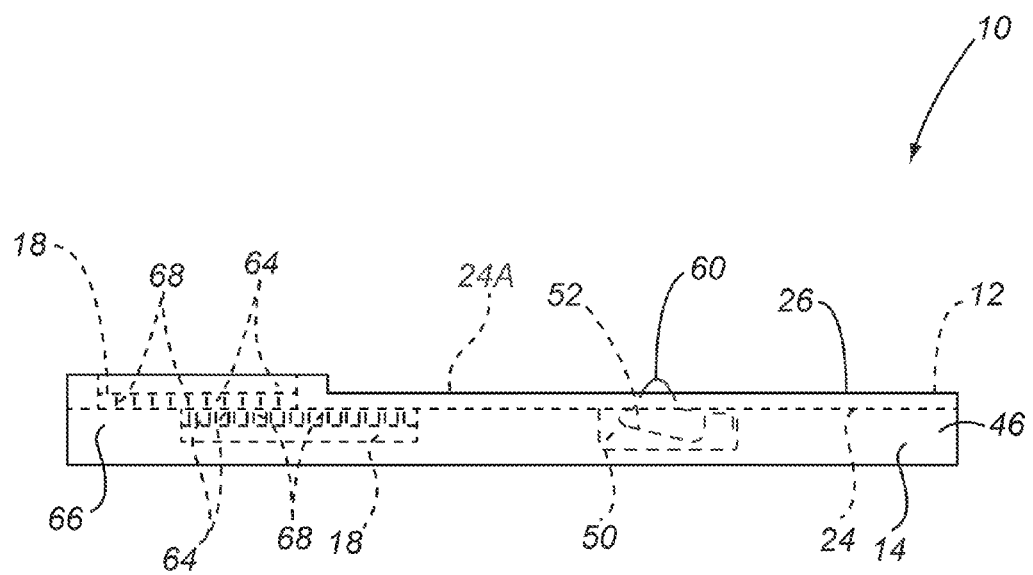
FIG. 25 is a side view of the external storage device of FIG. 12 with two memory die stacks positioned on two surfaces of a substrate, each memory die stack having two dies.
Figure 26:
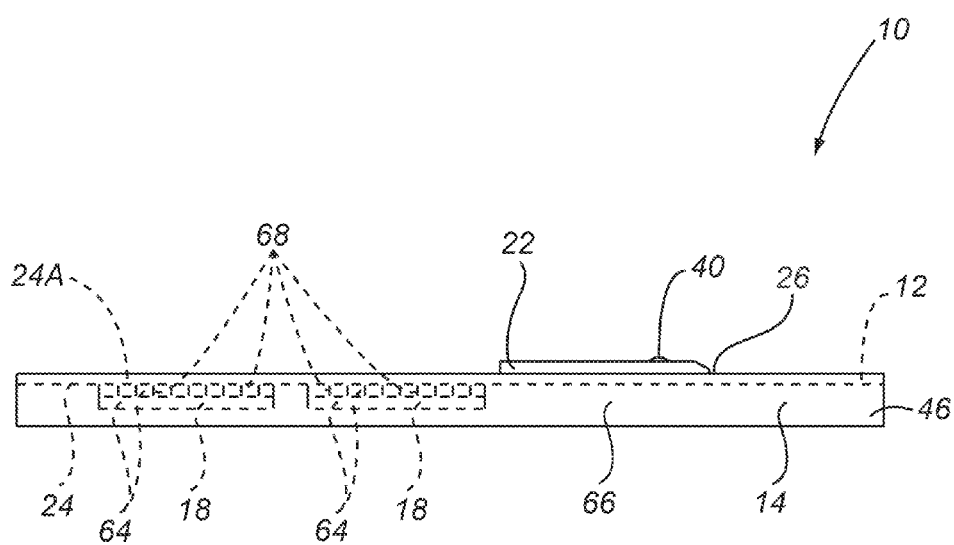
FIG. 26 is a side view of the external storage device of FIG. 2 with two memory die stacks positioned on a component surface of a substrate, each memory die stack having two dies.
Figure 27:
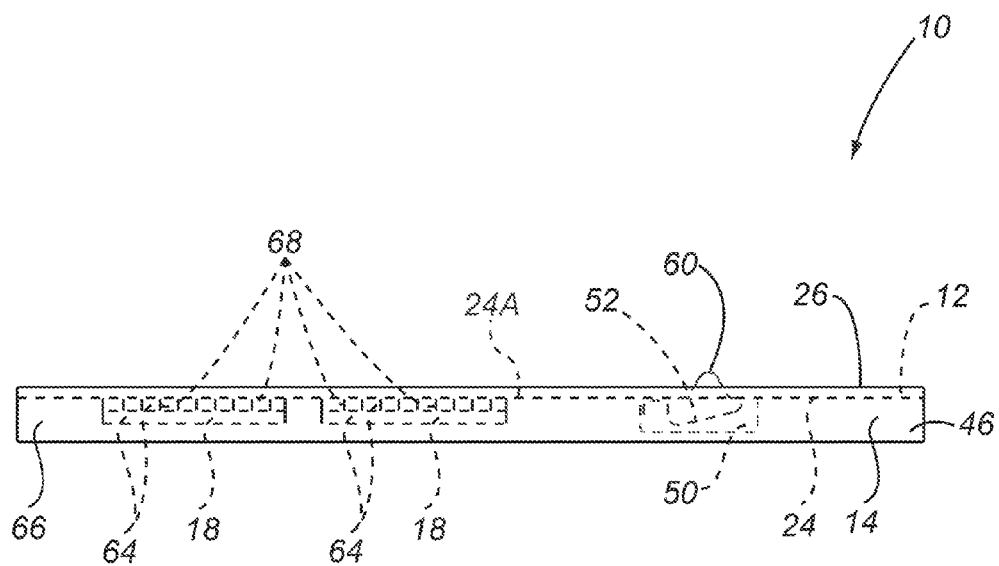
FIG. 27 is a side view of the external storage device of FIG. 12 with two memory die stacks positioned on a component surface of a substrate, each memory die stack having two dies.

In other embodiments, such as the embodiments shown in FIG. 12, the connector 14 may comprise the plurality of connection fingers 20 discussed above, along with a mounting bar 50. As best illustrated in FIG. 13, the mounting bar 50 is positioned on the component surface 24 so that the connection surface 26 may remain substantially flat if desirable. In these embodiments, as best shown in FIGS. 13-15, the mounting bar 50 may comprise a plurality of contact springs 52. Each spring 52 may be formed of a resilient material that, when bent or compressed, exerts a force to return to its original shape. One of ordinary skill in the relevant art will understand that the springs 52 may be made of any suitable material and have any suitable design that allows the mounting bar 50 to electrically couple to the corresponding connector when the connector 14 is inserted within the corresponding connector.

As shown in FIG. 15, the mounting bar 50 may also include a plurality of receptacles 54 that are shaped to receive the contact springs 52. As illustrated in FIG. 14, each spring 52 may include a hook 56 that mounts and electrically couples the spring 52 to an edge 58 of the mounting bar 50, which is best shown in FIG. 15. In some embodiments, such as the embodiments shown in FIG. 14, the hook 56 may have a U-shape that substantially conforms to the shape of the edge 58. In other embodiments the hook 56 may be substantially straight and configured to be inserted within a corresponding aperture on the edge 58. One of ordinary skill in the relevant art will understand that any suitable coupling arrangement may be used between the hook 56 and the edge 58.

Each spring 52 may also include a coupling projection 60, as best illustrated in FIGS. 14-15. In some embodiments, the coupling projection 60 may be integrally formed with the spring 52. In other embodiments, the coupling projection 60 may be soldered or otherwise electrically coupled to the spring 52 in a suitable manner that allows the coupling projection 60 to be electrically coupled to the substrate 12. The coupling projection 60 may have any suitable shape that provides sufficient contact with the corresponding connector when the connector 14 is inserted within the corresponding connector. Examples of suitable shapes include but are not limited to a triangular, L-shape, U-shape, T-shape, solid projection having a circular or rectilinear cross-sectional shape, or other suitable shapes.

In these embodiments, the mounting bar 50 may be mounted to and electrically coupled directly to the substrate 12. By incorporating the mounting bar 50 within the internal assembly of the device 10, the mounting bar 50 is electrically coupled directly to the substrate 12 without the need to solder the mounting bar 50 to a plurality of coupling points 28. However, one of ordinary skill in the relevant art will understand that any suitable configuration of the mounting bar 50 and/or springs 52 may be used in conjunction with the USB 3.0 standard or other suitable standards. As illustrated in FIGS. 17, 19, 21, 23, 25, 27, 30, and 32, one of ordinary skill in the relevant art will understand that the mounting bar 50 may be positioned in any suitable orientation relative to the substrate 12.

The mounting bar 50 may then electrically couple the substrate 12 to the corresponding connector via the coupling projections 60. In these embodiments, a plurality of apertures 62 are positioned in the component surface 24 adjacent the plurality of connection fingers 20. The coupling projections 60 are configured to extend through the apertures 62 when the springs 52 are in an uncompressed position.

When the connector 14 is inserted within the corresponding USB 3.0 connector (not shown), the USB 3.0 connector presses against the coupling projections 60, in turn applying a compressive force to the springs 52. When the springs 52 are compressed by the USB 3.0 connector, the spring-loaded design of each spring 52 then applies a force to create a firm electrical coupling between the USB 3.0 connector and each coupling projection 60 when the connector 14 is inserted within the corresponding USB 3.0 connector.

In the various embodiments described herein, an outer casing 66 may be applied to enclose the assembled substrate 12 and components. In some embodiments, a sealant may be applied to the mounting bar 50 to prevent the case material from flowing into the mounting bar 50 and the internal assembly of the device 10 during the assembly process. Specifically, glue or epoxy may be used to ensure a tight connection and avoid having the case material introduced into the space below the contact bar 22.

In the embodiments where the mounting bar 50 is mounted on the component surface 24, the mounting bar 50 does not form a projection on the otherwise substantially flat connection surface 26. In some embodiments, the thickness of the mounting bar 50 may not exceed the thicknesses of the other components positioned on the component surface 24, thus allowing at least the mounting bar 50 portion of the connector 14 to be incorporated into the existing dimensions of the device 10. Moreover, the retractable design of the contact springs 52 may allow the coupling projections 60 to completely retract within the outer casing 66 when the device 10 is inserted within a corresponding USB 2.0 connector.

Furthermore, by incorporating the mounting bar 50 within the outer casing 66, the manufacturing throughput is improved because the device 10 is assembled as one single part, which is easy to handle by pick and place assembly machines.

Figure 35:
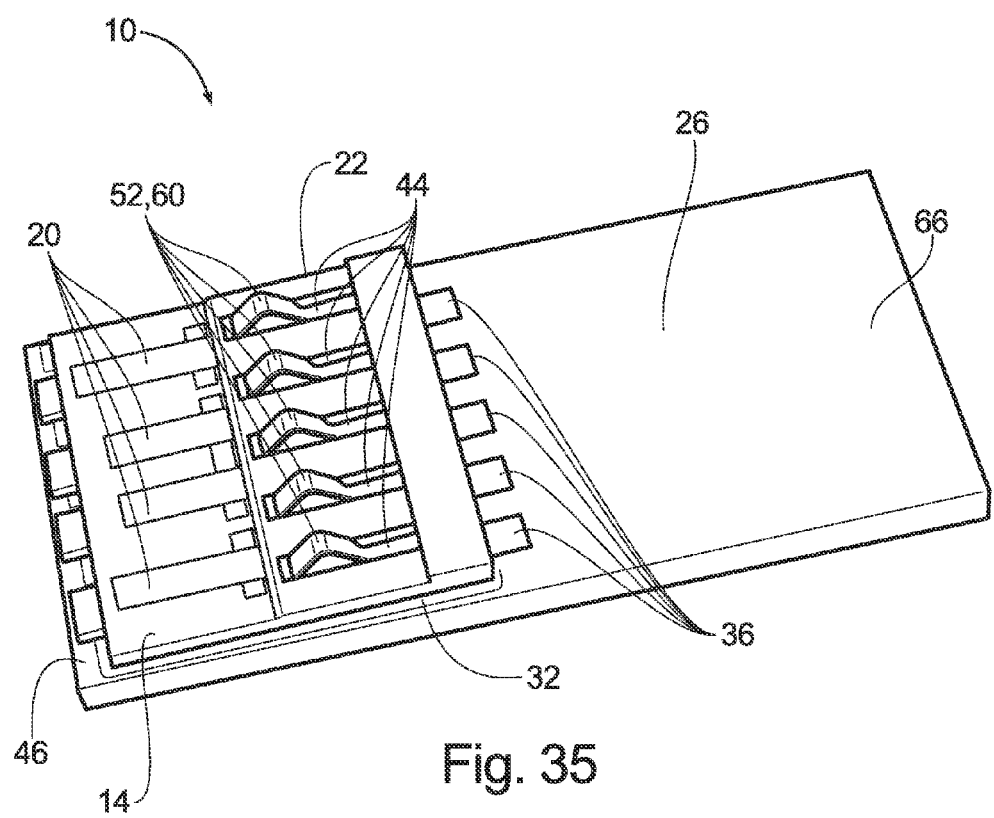
FIG. 35 is a side perspective view of an external storage device according to other embodiments of the present invention.

In other embodiments, such as the embodiments shown in FIG. 35, the connector 14 may comprise a combination of the contact bar 22 and the springs 52 discussed above. In these embodiments, the connection fingers 20 may be mounted to or embedded within the cover 32 of the contact bar 22 and electrically coupled to the substrate 12. The cover 32 may also include the plurality of apertures 44 positioned adjacent and/or behind the connection fingers 20. Each spring 52 may be mounted to the contact bar 22 so that the coupling projection 60 extends through each aperture 44 when the springs 52 are in an uncompressed position. Each spring 52 may also include the connection pad 36, which may be integrally formed with the spring 52, soldered or otherwise electrically coupled to the spring 52 in a suitable matter that allows the coupling projection 60 to electrically couple to the substrate 12.

In these embodiments, such as the embodiments illustrated in FIGS. 16-32, the memory die stack 18 may include at least one die 64. For example, in FIGS. 16-19 and 22-23, each memory die stack 18 can include a single die 64. The memory die stacks 18 shown in FIGS. 20-21 and 24-30 can include two dies 64 in each memory die stack 18. Each memory die stack 18 shown in FIGS. 31-34 may include four dies 64 within each memory die stack 18. One of ordinary skill in the relevant art will understand that the memory die stack 18 may include 1, 2, 4, or any suitable number of dies 64. Each die 64 may include connectors 68 that connect the die 64 to a memory channel 70, which in turn connects the die 64 to the controller 16. In some embodiments, the design may include a pair of memory channels 70, also known as dual channel processing, wherein each die 64 (in a memory die stack 18 having two dies 64) is connected to each memory channel 70. With a dual channel configuration, the controller 16 may access each die 64 together or separately. As a result, transactions may be executed twice as fast with dual channel processing.

Figure 33:
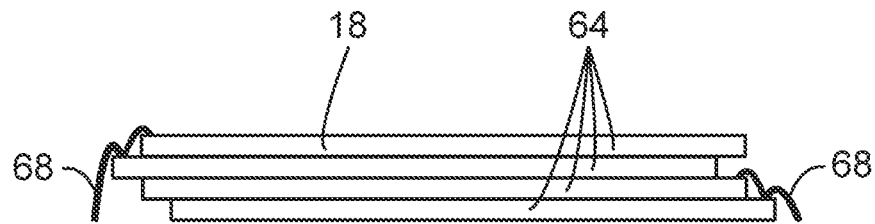
FIG. 33 is a side view of the memory die stack of the external storage device of FIG. 31 or 32, wherein the dies are arranged in a stair step pattern.
Figure 34:
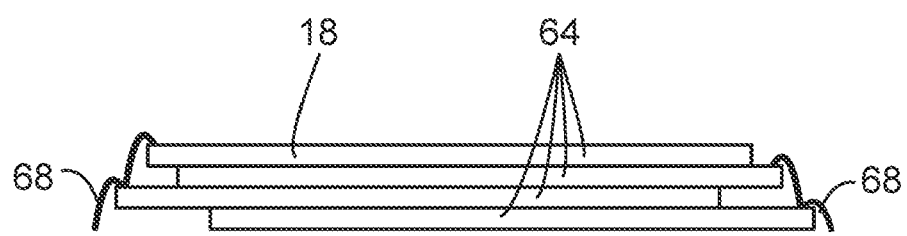
FIG. 34 is a side view of the memory die stack of the external storage device of FIG. 31 or 32, wherein the dies are arranged in an alternating pattern.

In the memory die stacks 18 that include more than one die 64, the dies 64 may be arranged within the memory die stack 18 in a variety of stacking patterns. For example, as shown in FIGS. 33-34, the dies 64 may be arranged in a stair step pattern (FIG. 33), an alternating pattern (FIG. 34), a straight stack, or other suitable stacking arrangements. Any suitable arrangement of dies 64 may be used that allow the connectors 68 from each die 64 to reach the memory channel 70. In some embodiments, such as the embodiments shown in FIGS. 20-21, 24-30, and 34, each die 64 may be rotated 180 degrees from each adjacent die 64. By stacking the dies 64 in a rotated orientation, the heat distribution is improved because the heat generating components (such as the connectors 68) are not adjacent one another.

Figure 28:
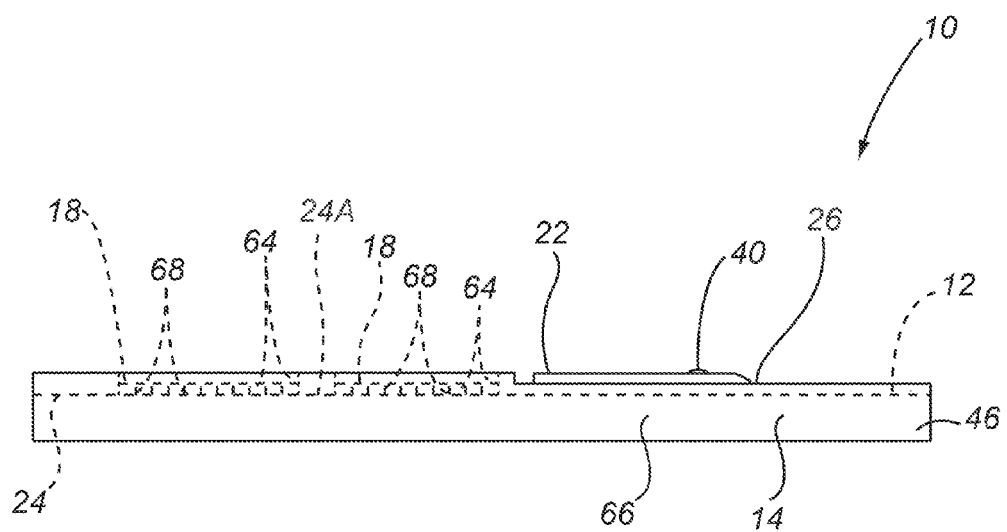
FIG. 28 is a side view of the external storage device of FIG. 2 with two memory die stacks positioned on a connection surface of a substrate, each memory die stack having two dies.
Figure 29:
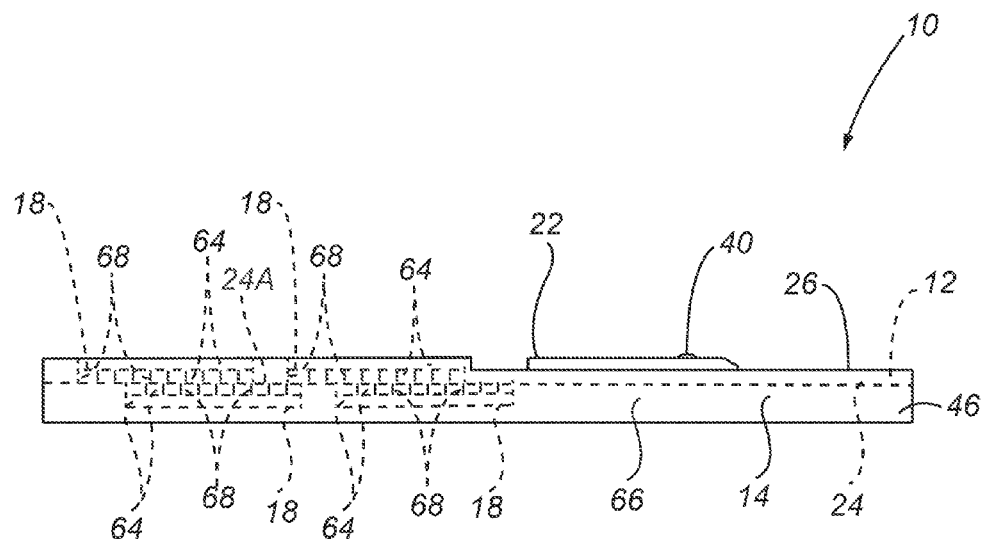
FIG. 29 is a side view of the external storage device of FIG. 2 with four memory die stacks positioned on two surfaces of a substrate, each memory die stack having two dies.
Figure 30:
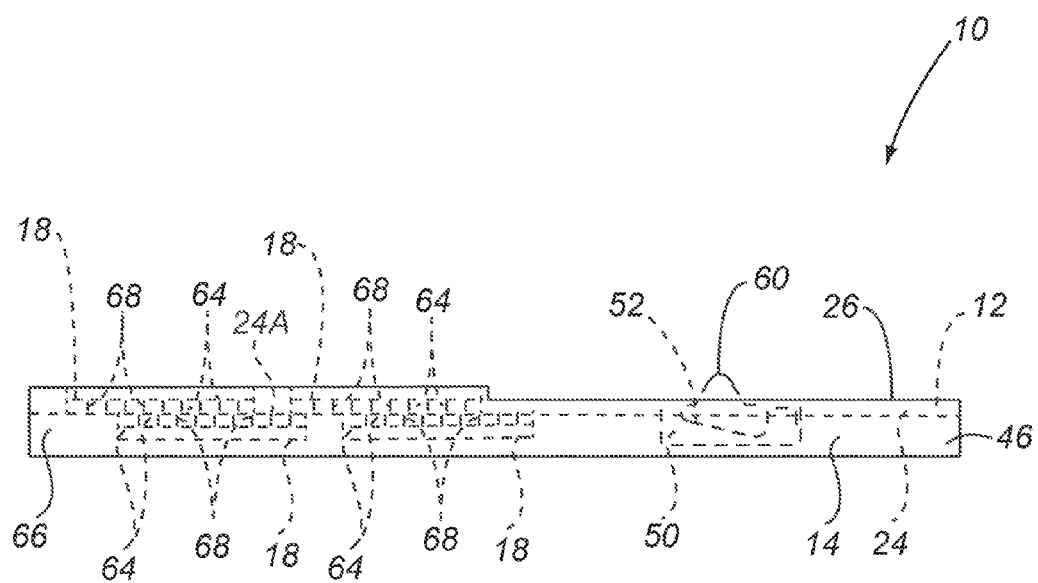
FIG. 30 is a side view of the external storage device of FIG. 12 with four memory die stacks positioned on two surfaces of a substrate, each memory die stack having two dies.

In some embodiments, such as the embodiments shown in FIGS. 16-17 and 20-21, a single memory die stack 18 may be mounted to and electrically coupled to the substrate 12. In other embodiments, such as the embodiments shown in FIGS. 18-19, 24-28, and 31-32, the device 10 may comprise two memory die stacks 18. In yet other embodiments, such as the embodiments shown in FIGS. 22-23 and 29-30, the device 10 may comprise four memory die stacks 18. In some embodiments, the memory die stacks 18 may be arranged opposite one another so that the memory die stacks 18 are equally distributed on the component surface 24 and an opposing component surface 24A (FIGS. 18-19, 22-25, 29-30), may be positioned on the component surface 24 only (FIGS. 16-17, 20-21, 26-27, and 31-32), or may be positioned on the opposing component surface 24A only (FIG. 28). However, one of ordinary skill in the relevant art will understand that any suitable location and distribution of memory die stacks 18 on the component surface 24 and the opposing component surface 24A may be utilized to achieve the desired performance of the device 10.

The inclusion of the additional memory die stacks 18 provides additional data speed for the device 10. In the embodiments shown in FIGS. 24-28, which include two memory die stacks 18 in a dual channel configuration (with each memory die stack 18 having two dies 64), the use of two memory die stacks 18 increases the design from a two-channel to a four-channel operation, which approximately doubles the data speed. In other embodiments shown in FIGS. 29-30, which include four memory die stacks 18 in a dual channel configuration (each memory die stack 18 having two dies 64), the design has an eight-channel operation, which approximate quadruples the data speed.

Figure 31:
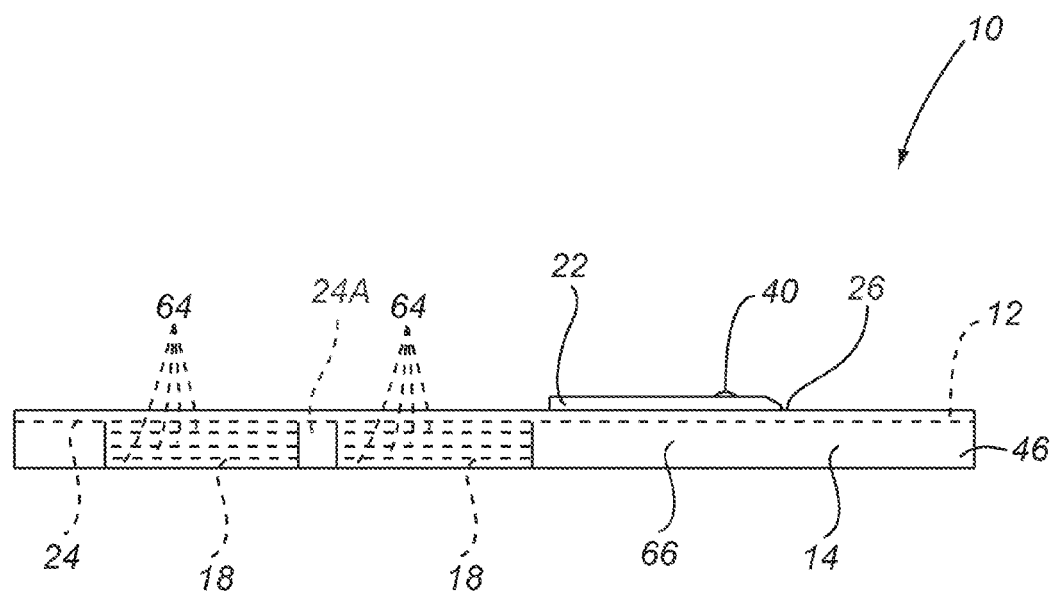
FIG. 31 is a side view of the external storage device of FIG. 2 with two memory die stacks positioned on a component surface of a substrate, each memory die stack having four dies.
Figure 32:
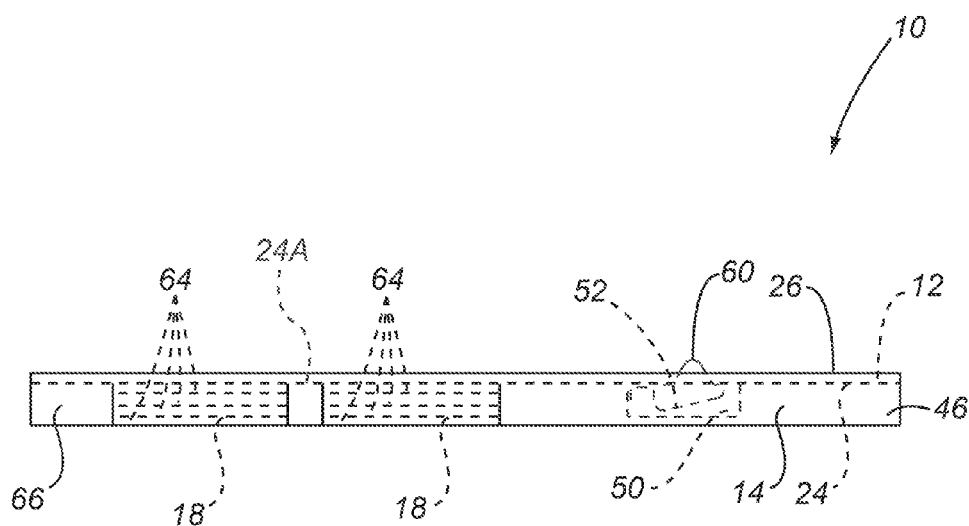
FIG. 32 is a side view of the external storage device of FIG. 12 with two memory die stacks positioned on a component surface of a substrate, each memory die stack having four dies.

Alternatively, as shown in FIGS. 31-32, an eight-channel operation may be achieved through the use of two memory die stacks 18 (with each memory die stack 18 having four dies 64) and a separate memory channel 70 for each die 64. In these embodiments, in order to minimize the height of the connectors 68, the connectors 68 between each die 64 to the memory channel 70 may pass through the other dies 64 located between the die 64 and the memory channel 70.

In the embodiments where two memory die stacks 18 are positioned adjacent one another (either on the component surface 24 or the opposing component surface 24A), the dies 64 in each memory die stack 18 can be stacked onto each other in an overlapping arrangement to conserve space on the substrate 12.

One of ordinary skill in the art will understand that any suitable number and configurations of dies 64 and memory die stacks 18 may be used to achieve the desired data speed and compact design of the device 10.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. An external storage device comprising:
    a substrate that includes a connection surface and a component surface, the connection surface opposite the component surface;
    at least one memory die stack mounted on one of the connection surface and the component surface of;
    a controller configured to access the at least one memory die stack, the controller mounted on one of the connection surface and the component surface of the substrate;
    a contact bar mounted on the connection surface of the substrate, the contact bar comprising a cover and a plurality of springs, each of the plurality of springs including a portion that is located at a first distance relative to the connection surface of the substrate;
    a plurality of connection fingers embedded to be exposed upon the cover of the contact bar, wherein the plurality of connection fingers are located at a second distance relative to the connection surface of the substrate, the second distance being less than the first distance; and
    wherein a first interface comprises the plurality of connection fingers, and a second interface comprises the plurality of springs.

2. The external storage device of claim 1, wherein each of the plurality of springs further comprises a projection configured to be located at the first distance in an uncompressed position.

3. The external storage device of claim 2, wherein the projections are configured to extend through a plurality of apertures in the cover in the uncompressed position.

4. The external storage device claim 1, wherein the at least one memory die stack is mounted on the component surface of the substrate.

5. The external storage device of claim 1, wherein the at least one memory die stack is mounted on the connection surface of the substrate.

6. The external storage device of claim 1, further comprising a plurality of memory die stacks, wherein at least one of the plurality of memory die stacks is mounted on the connection surface of the substrate, and at least one of the plurality of memory die stacks is mounted on the component surface of the substrate.

7. The external storage device of claim 6, wherein each of the plurality of memory die stacks comprises a plurality of dies.

8. The external storage device of claim 7, wherein the plurality of dies of at least two of the plurality of memory die stacks are stacked in an overlapping arrangement.

9. The external storage device of claim 1, wherein the first distance comprises a first height above the connection surface, and the second distance comprises a second height above the connection surface, wherein the second height is less than the first height.

10. The external storage device of claim 1, wherein each of the springs includes a connection pad.

11. The external storage device of claim 10, wherein each of the springs is integrally formed with the corresponding connection pad.

12. A external storage device comprising:
    a substrate that includes a connection surface and a component surface, the connection surface opposite the component surface;
    at least one memory die stack mounted on one of the connection surface and the component surface of the substrate;
    a controller configured to access the at least one memory die stack, the controller mounted on one of the connection surface and the component surface of the substrate;
    a contact bar mounted on the connection surface of the substrate, the contact bar comprising a cover and a plurality of springs, each of the plurality of springs including a portion that is located at a first distance relative to the connection surface of the substrate;
    a plurality of connection fingers embedded to be exposed upon the cover of the contact bar, wherein the plurality of connection fingers are located at a second distance relative to the connection surface of the substrate, the second distance being less than the first distance; and
    a plurality of coupling points mounted on the connection surface of the substrate for electrically coupling with the contact bar;

wherein a first interface comprises the plurality of connection fingers, and a second interface comprises the plurality of springs.

13. The external storage device of claim 12, wherein the at least one memory die stack is mounted on the component surface of the substrate.

14. The external storage device of claim 12, wherein the at least one memory die stack is mounted on the connection surface of the substrate.

15. The external storage device of claim 12, further comprising a plurality of memory die stacks, wherein at least one of the plurality of memory die stacks is mounted on the connection surface of the substrate, and at least one of the plurality of memory die stacks is mounted on the component surface of the substrate.

16. The external storage device of claim 15, wherein each of the plurality of memory die stacks comprises a plurality of dies.

17. The external storage device of claim 16, wherein the plurality of dies of at least two of the plurality of memory die stacks are stacked in an overlapping arrangement.

18. An external storage device comprising:

a substrate that includes a connection surface and a component surface, the connection surface opposite the component surface;

at least one memory die stack mounted on one of the connection surface and the component surface of;

a controller configured to access the at least one memory die stack, the controller mounted on one of the connection surface and the component surface of the substrate;

a contact bar mounted on the connection surface of the substrate, the contact bar comprising a cover and a plurality of springs, each of the plurality of springs including a portion that is located at a first distance relative to the connection surface of the substrate;

a plurality of connection fingers embedded to be exposed upon the cover of the contact bar, wherein the plurality of connection fingers are located at a second distance relative to the connection surface of the substrate, the second distance being less than the first distance; and wherein a first interface comprises the plurality of connection fingers, and a second interface comprises the plurality of springs; and wherein the external storage device is configured to support Universal Serial Bus "USB") 2.0 and USB 3.0 standards in effect as of Jan. 31, 2011.

* * * * *